United States Patent
Maresca

[11] 4,339,568
[45] Jul. 13, 1982

[54] AROMATIC POLYMERS CONTAINING KETONE GROUPS

[75] Inventor: Louis M. Maresca, Belle Mead, N.J.

[73] Assignee: Union Carbide Corporation, Danbury, Conn.

[21] Appl. No.: 99,582

[22] Filed: Dec. 3, 1979

[51] Int. Cl.³ .................... C08G 8/02; C08G 14/14
[52] U.S. Cl. .................... 528/126; 528/125; 528/128
[58] Field of Search .................... 528/125, 126, 128

[56] References Cited

U.S. PATENT DOCUMENTS

| | | | |
|---|---|---|---|
| Re. 28,252 | 11/1974 | Barr et al. | 260/49 |
| 3,332,909 | 7/1967 | Farnham et al. | 528/219 |
| 3,886,120 | 5/1975 | Yagi et al. | 528/128 |
| 4,108,837 | 8/1978 | Johnson et al. | 528/128 |
| 4,169,178 | 9/1979 | Freeman | 528/128 |
| 4,176,222 | 11/1979 | Cinderey et al. | 528/128 |
| 4,186,262 | 1/1980 | Freeman et al. | 528/128 |
| 4,200,727 | 4/1980 | Blinne et al. | 528/128 |

FOREIGN PATENT DOCUMENTS 1414421 11/1975 United Kingdom.

*Primary Examiner*—H. S. Cockeram
*Attorney, Agent, or Firm*—Donald M. Papuga

[57] ABSTRACT

Described herein are thermoplastic linear polymers containing recurring units of the formulae:

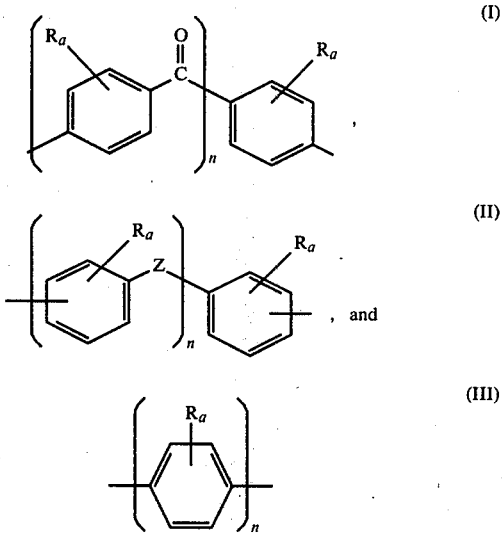

wherein R is independently hydrogen, $C_1$ to $C_6$ alkyl, or $C_4$ to $C_8$ cycloalkyl, a is an integer of 0 to 4, Z is independently

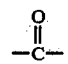

—SO—, —S—, —SO$_2$—, —O—, alkylene, cycloalkylene, arylene, alkylidene, or cycloalkylidene containing from 2 to 20 carbon atoms, with the proviso that Z cannot be $$-\overset{\overset{\displaystyle O}{\|}}{C}-$$

when the connecting ether bonds are in the para position to Z; n is independently an integer of from 1 to 5. The units are attached to each other by an —O— bond. Also, described herein is a process for preparing such polymers.

8 Claims, No Drawings

AROMATIC POLYMERS CONTAINING KETONE GROUPS

This invention is directed to thermoplastic linear polymers containing ketone groups and a method for their production.

The poly(arylether ketone) having the following formula:

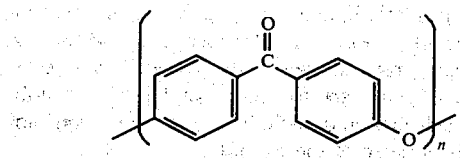

is well known in the prior art. It is a crystalline polymer having excellent mechanical and thermal properties. It is useful, for example, in wire and cable coating and can be molded into electrical connectors of superior performance.

However, this particular polymer is prepared by the following procedure:

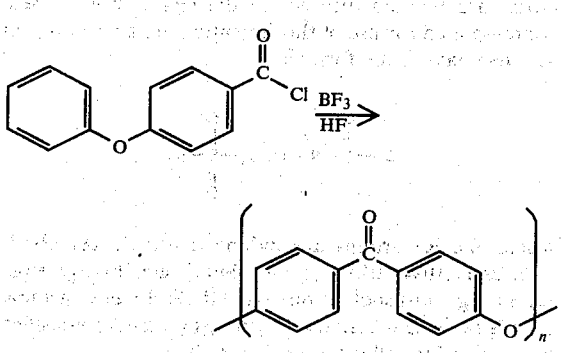

Thus, the preparation of the poly(arylether ketone) is not only difficult, but also requires the use of hydrofluoric acid which is poisonous, detrimental to the environment and otherwise hazardous to work with.

Attempts have been made to develop another method of synthesizing the poly(arylether ketone) without the use of hydrofluoric acid, or alternatively, to develop other polymers with properties comparable to those of this poly(arylether ketone).

The polymers of this invention are easily prepared without the use of hydrofluoric acid and have excellent mechanical and thermal properties. In addition, several polymers emcompassed by this invention exhibit crystalline behavior which further enhances their general performance. Thus, they can be substituted for the described poly(arylether ketone).

THE INVENTION

This invention is directed to thermoplastic linear polymers containing ketone groups and a method for their production.

The polymers of this invention contain recurring units of the following formulae:

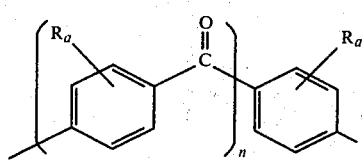

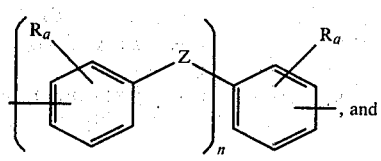

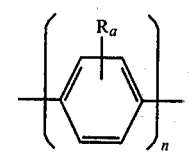

wherein R is independently hydrogen, $C_1$ to $C_6$ alkyl, or $C_4$ to $C_8$ cycloalkyl, a is an integer of 0 to 4, Z is independently

—SO—, —S—, —SO$_2$—, —O—, alkylene, cycloalkylene, arylene, alkylidene, or cycloalkylidene containing from 2 to 20 carbon atoms, with the proviso that Z cannot be

when the connecting ether bonds are in the para position to Z; n is independently an integer of from 1 to 5; said units (I), (II), and (III) being attached to each other by an —O— bond. The recurring units (I), (II), and (III) can be distributed in the polymer in any manner, i.e., randomly, in a block manner, or in an alternating manner.

The polymers of this invention have a reduced viscosity from about 0.4 to about 2.0 as measured in p-chlorophenol, or other suitable solvent, at 50° C.

The polymers herein are prepared by reacting the monomers represented by the following formulae:

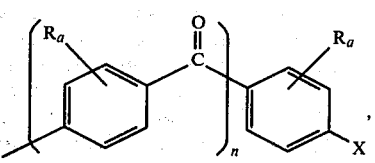

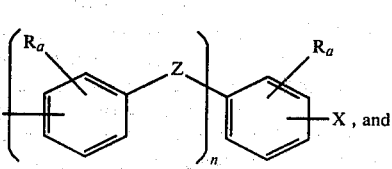

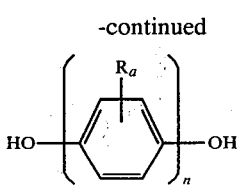

(VI)

wherein R, Z, n, and a are as previously defined, and X is independently selected from Cl, Br, F, $NO_2$ or OH.

The ratio of the concentration of OH groups to Cl, Br, F, and/or $NO_2$ groups used to form the polymer is from 0.90:1.10 to 1.10:0.90, preferably 0.98:1.02 to 1.02:0.98.

The monomers, represented by formulas (IV) to (VI), include the following:
hydroquinone,
2-methylhydroquinone
4,4'-biphenol,
2,2-bis(4-hydroxyphenyl) propane,
4,4'-dihydroxydiphenyl ether,
4,4'-dihydroxydiphenyl sulfide,
4-chloro-4'-hydroxydiphenyl sulfone
4,4'-dihydroxydiphenyl sulfone,
2,4'-dihydroxydiphenyl sulfone,
4,4'-dichlorodiphenyl sulfone,
2,4'-dinitrodiphenyl sulfone,
4,4'-dihydroxydiphenyl sulfoxide,
2,4-dichlorodiphenyl sulfoxide,
4,4'-dibromodiphenyl sulfoxide,
4,4'-dichlorobenzophenone,
4,4'-difluorobenzophenone,
4-chloro-4'-hydroxybenzophenone
4'-hydroxy-4'-nitrobenzophenone
4,4'-dinitrobenzophenone, and the like.

The preferred monomers include 4,4'-dichlorodiphenyl sulfone, 4,4'-dichlorobenzophenone and hydroquinone. These preferred monomers are reacted to form a polymer of the following formula:

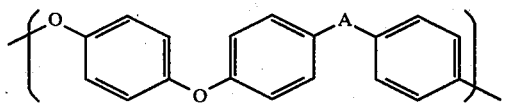

wherein the A units are

and $-SO_2-$.

The polymers of this invention are prepared by contacting substantially equimolar amounts of the hydroxy containing compounds (depicted in formulas IV, V and VI, supra) and halo and/or nitro containing conpounds (depicted in formulas IV and V, supra) with from about 0.5 to about 1.0 mole of an alkali metal carbonate per mole of hydroxyl group in a solvent mixture comprising a solvent which forms an azeotrope with water and a polar aprotic solvent, at a temperature of from about 120° to about 250° C., while continuously removing water from the reaction mass as an azeotrope with the azeotrope forming solvent to maintain the reaction medium at substantially anhydrous conditions.

The temperature of the reaction is kept at from about 120° to about 180° C., for about 1 to about 5 hours and then raised and kept at from about 200° to about 250° C., preferably from about 210° to about 230° C., for about 1 to 5 hours.

The reaction is carried out in an inert atmosphere, e.g., nitrogen, at atmospheric pressure, although higher or lower pressures may be used.

The polymer is then recovered by conventional techniques such as coagulation, solvent evaporation, and the like.

The solvent mixture comprises a solvent which forms an azeotrope with water and a polar aprotic solvent. The solvent which forms an azeotrope with water includes an aromatic hydrocarbon such as benzene, toluene, xylene, ethylbenzene, chlorobenzene, and the like.

The polar aprotic solvent employed are those generally known in the art for the manufacture of polyarylether sulfones and include sulfur containing solvents such as those of the formula:

$$R_1-S(O)_b-R_1$$

in which each $R_1$ represents a monovalent lower hydrocarbon group free of aliphatic unsaturation, and preferably contains less than about 8 carbon atoms or when connected together represents a divalent alkylene group with b being an integer from 1 to 2 inclusive. Thus, in all of these solvents all oxygens and two carbon atoms are bonded directly to the sulfur atom. Thus, contemplated for use in this invention are such solvents as those having the formula:

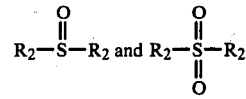

where the $R_2$ groups are independently lower alkyl, such as methyl, ethyl, propyl, butyl, and like groups, and aryl groups such as phenyl and alkylphenyl groups as well as those where the $R_2$ groups are interconnected as in a divalent alkylene bridge such as

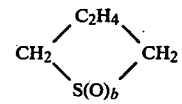

in thiophene oxides and dioxides. Specifically, these solvents include dimethylsulfoxide, dimethylsulfone, diphenylsulfone, diethylsulfoxide, diethylsulfone, diisopropylsulfone, tetrahydrothiophene 1,1-dioxide (commonly called tetramethylene sulfone or sulfolane) and tetrahydrothiophene-1 monoxide.

Additionally, nitrogen containing solvents may be used. These include dimethyl acetamide, dimethyl formamide and N-methylpyrolidone.

The azeotrope forming solvent and polar aprotic solvent are used in a weight ratio of from about 10:1 to about 1:1, preferably from about 4:1 to about 3:1.

In the reaction, the hydroxy containing compound is slowly converted, in situ, to the alkali salt thereof by reacting with the alkali metal carbonate. The alkali metal carbonate is preferably potassium carbonate.

Water is continuously removed from the reaction mass as an azeotrope with the azeotrope forming solvent so that substantially anhydrous conditions are maintained.

It is essential in the polymerization reaction that the solvent be maintained substantially anhydrous during the reaction. While amounts of water up to about one percent can be tolerated, and are somewhat beneficial when employed with fluorinated dihalobenzenoid compounds, amounts of water substantially greater than this are desirably avoided as the reaction of water with the halo and/or nitro compound leads to formation of phenolic species and only low molecular weight products are secured. Consequently, in order to secure the high polymers, the system should be substantially anhydrous, and preferably contain less than 0.5 percent by weight water during the reaction.

Preferably, after the desired molecular weight has been attained, the polymer is treated with an activated aromatic halide or an aliphatic halide such as methyl chloride or benzyl chloride, and the like. Such treatment of the polymer converts the hydroxyl groups into ether groups which stabilize the polymer. The polymer so treated has good melt and oxidative stability.

EXAMPLES

The following examples serve to give specific illustrations of the practice of this invention but they are not intended in any way to limit the scope of this invention. In these examples, all parts and percentages are on a weight basis unless otherwise specified.

EXAMPLE 1

The following Examples 1 to 5 describe the preparation of a random terpolymer.

A four neck 500 ml round-bottom flask was equipped with a mechanical stirrer, thermometer, dropping funnel, dry nitrogen inlet, and vacuum jacketed vigreux column with Dean Stark trap and condenser. Into the flask were charged 30.12 g (0.12 moles) of 4,4'-dichlorobenzophenone, 8.61 g (0.03 moles) of 4,4'-dichlorodiphenyl sulfone, 16.52 g (0.15 moles) of hydroquinone, 24.88 g (0.18 moles) of potassium carbonate, 50 ml of toluene and 138 ml of sulfolane. The mixture was purged with nitrogen for 1 hour at room temperature and then heated to reflux (135° to 170° C.). After 1 hour at reflux, the toluene was removed and the temperature of the reaction was increased to about 225° C. Fresh toluene was thereafter added dropwise into the reactor for the remainder of the reaction to insure continuous and complete dehydration. After 1 hour at about 225° C. methyl chloride was bubbled into the reaction for 30 minutes to cap phenate end groups on the polymer. The reaction product was poured into an aluminum pan where it was allowed to cool and solidify. After pulverizing the solid product in a Waring blender, the material was washed several times with warm distilled water. The final wash was acidified with oxalic acid to a pH of 2.0. The polymer was then dried in a vacuum oven at 200° C. for 24 hours. A theoretical yield of the polymer was obtained. The reduced viscosity of the polymer was measured in p-chlorophenol (0.20 g/100 ml) at 50° C. and found to be 1.02 dl/g.

EXAMPLES 2 TO 4

The procedure as described in Example 1 was exactly repeated except that the mole ratio of 4,4'-dichlorobenzophenone to 4,4'-dichlorodiphenyl sulfone reactants was varied as shown in Table I.

EXAMPLE 5

The procedure as described in Example 1 was exactly repeated except that 4,4'-difluorobenzophenone was used instead of 4,4'-dichlorobenzophenone.

The results are shown in Table I.

| Example | Mole Ratio of Dihalobenzophenone/Dichlorodiphenyl Sulfone | Reduced Viscosity (dl/gm) |
|---|---|---|
| 1 | 80/20 | 0.68 |
| 2 | 70/30 | 1.10 |
| 3 | 60/40 | 0.84 |
| 4 | 50/50 | 0.93 |
| 5 | 80/20 | 1.02 |

The polymers prepared in Examples 1 to 5 were molded into ASTM test bars and tested for the following properties: Textile strength and modulus according to ASTM D-638; yield strength according to ASTM D-790; yield elongation according to ASTM D-790; elongation at break according to ASTM D-638; pendulum impact strength according to ASTM D-1822. Also the glass transition temperature of the polymer was recorded.

The results are summarized in Table II.

TABLE II

| Example | Reduced Viscosity (dl/g) | Glass Transition Temp. (°C.) | Tensile Modulus (psi) | Yield Strength (psi) | Tensile Strength (psi) | Yield Elongation (%) | Elongation at Break (%) | Pendulum Impact Strength (ft.-lbs./in.$^3$) |
|---|---|---|---|---|---|---|---|---|
| 1 | 1.02 | 155 | 301,000 | 9,700 | 9,700 | 4.8 | 8.0 | 111 |
| 2 | 0.90 | 155 | 269,000 | 9,200 | 9,200 | 5.0 | 18 | 150 |
| 3 | 0.84 | 160 | 279,000 | 9,670 | 9,670 | 5.5 | 7.0 | 100 |
| 4 | 0.93 | 165 | 264,000 | 9,070 | 9,070 | 4.8 | 20 | 82 |
| 5 | 0.68 | 155 | 329,000 | 10,700 | 10,700 | 6.0 | 16 | 109 |

EXAMPLE 6

This Example shows the preparation of a block terpolymer.

A copolymer of diphenyl sulfone and hydroquinone having a molecular weight of about 5000 was prepared by reacting for about 2 hours at a temperature of 140° to 180° C., 8.61 g (0.030 moles) of 4,4'dichlorodiphenyl sulfone, 3.52 g (0.032 moles) of hydroquinone, 5.31 g (0.038 moles) of K$_2$CO$_3$, 40 ml of toluene and 50 ml of sulfolane in the apparatus described in Example 1. The mixture was cooled to room temperature and 26.18 g (0.120 moles) of difluorobenzophenone, 12.99 g (0.118 moles) of hydroquinone, 19.57 g (0.142 moles) of potassium carbonate, 50 ml of toluene and 90 ml of sulfolane was added. After purging with nitrogen for 30 min. the reaction was heated to reflux (140° to 150° C.) for 1 hour. The distillate was removed and the temperature was increased to about 225° C. Fresh toluene was added dropwise for the remainder of the reaction. The mixture became extremely viscous after 40 minutes at 225° C. Methyl chloride was added for 30 minutes and the polymer was recovered by the procedure described in Example 1. The reduced viscosity of the polymer was measured in p-chlorophenol. (0.20 g/100 ml) at 50° C. and found to be 0.62 dl/g.

COMPARATIVE EXAMPLE A

In this Example a copolymer of dichlorobenzophenone and hydroquinone was prepared by the procedure as described in Example 1 except diphenylsulfone was used as a solvent and the temperature was in excess of 300° C.

COMPARATIVE EXAMPLE B

In this Example a copolymer of 4,4'-dichlorodiphenyl sulfone and hydroquinone was prepared by the procedure as described in Example 1.

The polymers produced in Example 1, comparative Examples A and B and a poly(arylether ketone) identified as Stilan 1000 (sold by Raychem Corporation and hereinafter identified as Control) were molded into ASTM test specimens and tested for the following properties: tensile modulus and strength according to ASTM yield elongation according to ASTM D-638; elongation at break according to ASTM D-638; pendulum impact strength according to ASTM D-1822. Also, the glass transition temperature and melting temperature was measured according to the procedure of A. Brown, "Second Order Transition Temperature and Fibre Properties," Textile Research Journal, 25, 891 (1955).

The results are shown in Table III.

The data in Table III shows that the polymer of this invention (Example 1) possesses an acceptable balance of mechanical properties. A copolymer of dichlorobenzophenon and hydroquinone (Comparative Example A) has poor mechanical properties, in comparision to the instant polymer, and also, it is highly crystalline and when molded is very brittle.

The copolymer of 4,4'-dichlorodiphenyl sulfone and hydroquinone has poor mechanical properties, in comparison to the instant polymer, and it is not crystalline.

(III)

wherein R is independently hydrogen, $C_1$ to $C_6$ alkyl, or $C_4$ to $C_8$ cycloalkyl, a is an integer of 0 to 4, Z is independently

—SO—, —S—, —SO$_2$—, —O—, alkylene, cycloalkylene, arylene, alkylidene, or cycloalkylidene containing 2 to 20 carbon atoms, with the proviso that Z cannot be $$-\overset{\overset{\displaystyle O}{\|}}{C}-$$

when the connecting ether bonds are in the para position to Z, n is independently an integer of from 1 to 5; said units (I), (II), and (III) being attached to each other by an —O— bond.

2. A polymer as defined in claim 1 wherein unit (I) has the formula:

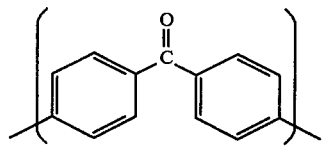

TABLE III

| Example | Tensile Modulus (psi) | Tensile Strength (psi) | Yield Elongation (%) | Elongation at Break (%) | Pendulum Impact Strength (ft.-lbs./in.$^3$) | Glass Transition Temp. (°C.) | Melt Temp. (°C.) |
|---|---|---|---|---|---|---|---|
| Control | 530,000 | 14,000 | — | 40 | 317 | 165 | 370 |
| 1 | 301,000 | 9,700 | 4.8 | 8.0 | 110 | 155 | 290 |
| Comparative Ex. A | 350,000 | 4,250 | — | 1.0 | 2.4 | 144 | 331 |
| Comparative Ex. B | 296,000 | 10,100 | 6.3 | 28 | 83 | 185 | — |

What is claimed is:

1. A thermoplastic linear terpolymer consisting essentially of recurring units of the formulae:

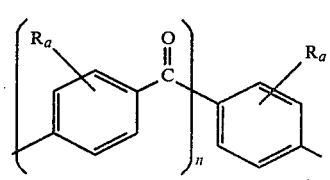
(I)

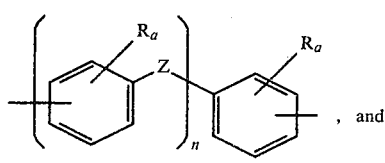
, and
(II)

3. A polymer as defined in claim 1 wherein unit (II) has the formula

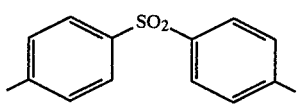

4. A polymer as defined in claim 1 wherein unit (III) has the formula:

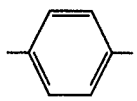

5. A thermoplastic linear polymer containing recurring units of the formulae:

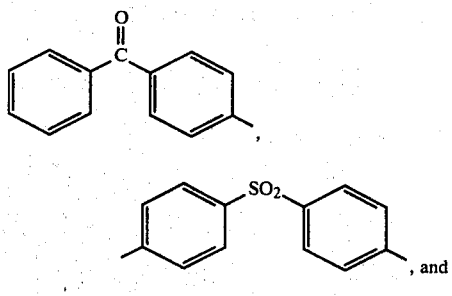,

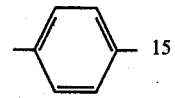, and

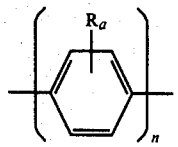

said units being attached to each other by an —O— bond.

6. A process for preparing a thermoplastic linear terpolymer consisting essentially of recurring units of the following formulae:

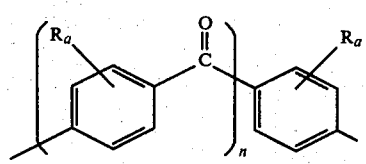 (I)

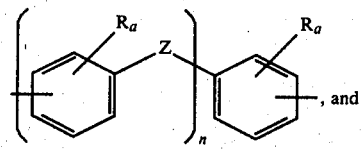 (II)

 (III)

wherein R is independently hydrogen, $C_1$ to $C_6$ alkyl, or $C_4$ to $C_8$ cycloalkyl, a is an integer of 0 to 4, Z is independently

—SO—, —S—, —$SO_2$—, —O—, alkylene, arylene, cycloalkylene, alkylidene, or cycloalkylidene containing 2 to 20 carbon atoms, with the proviso that Z cannot be $$-\overset{O}{\underset{\|}{C}}-$$

when the connecting ether bonds are in the para position to Z; n is independently an integer of from 1 to 5; said units (I), (II), and (III) being attached to each other by an —O— bond; said process comprising reacting substantially equimolar amounts of the OH containing monomers and Cl, Br, F or $NO_2$ containing monomers represented by the following formulae:

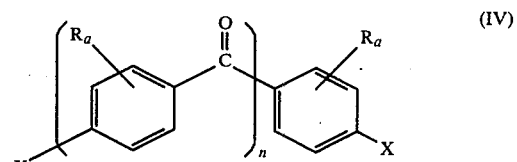 (IV)

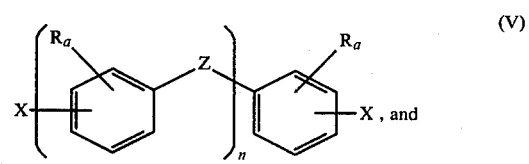 (V)

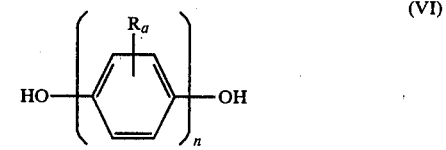 (VI)

wherein R, Z, n and a are as previously defined, and X is independently selected from Cl, Br, F, $NO_2$ or OH, with an alkali metal carbonate in a solvent mixture comprising a solvent which forms an azeotrope with water and a polar aprotic solvent, at a temperature of from about 120° to about 250° C., while continuously removing water from the reaction mass as an azeotrope with the azeotrope forming solvent to maintain the reaction at substantially anhydrous conditions.

7. A process as defined in claim 6 wherein the alkali metal carbonate is present in amounts of from about 0.5 to about 1.0 mole per mole of OH group.

8. A process for preparing a thermoplastic linear polymer by reacting 4,4-dichlorodiphenyl sulfone, 4,4'-dichlorobenzophenone, and hydroquinone with an alkali metal carbonate in a solvent mixture comprising a solvent which forms an azeotrope with water and a polar aprotic solvent, at a temperature of from about 120° to about 250° C., while continuously removing water from the reaction mass as an azeotrope with the azeotrope forming solvent to maintain the reaction at substantially anhydrous conditions.

* * * * *

Notice of Adverse Decision in Interference

In Interference No. 101,968, involving Patent No. 4,339,568, L. M. Maresca, AROMATIC POLYMERS CONTAINING KETONE GROUPS, final judgmemt adverse to the patentee was rendered Aug. 8, 1989, as to claims 1-4.